(12) United States Patent
Ikeda et al.

(10) Patent No.: US 6,885,865 B2
(45) Date of Patent: Apr. 26, 2005

(54) MOBILE COMMUNICATION SYSTEM, AND LOCATION REGISTRATION METHOD OF MOBILE STATION, RESOURCE CONTROL METHOD AND RECORDING MEDIUM IN MOBILE COMMUNICATION SYSTEM

(75) Inventors: Takehiro Ikeda, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 495 days.

(21) Appl. No.: 09/993,585

(22) Filed: Nov. 6, 2001

(65) Prior Publication Data

US 2002/0082009 A1 Jun. 27, 2002

(30) Foreign Application Priority Data

Nov. 10, 2000 (JP) ........................................ 2000-343886

(51) Int. Cl.⁷ ................................................ H04Q 7/20
(52) U.S. Cl. .................... 455/433; 455/435.1; 455/434; 455/450; 455/456.1
(58) Field of Search ............................. 455/433, 435.1, 455/434, 450, 456.1

(56) References Cited

U.S. PATENT DOCUMENTS

| | | | |
|---|---|---|---|
| 5,572,221 A | 11/1996 | Marlevi et al. ............. | 342/452 |
| 5,901,353 A | 5/1999 | Pentikainen ................ | 455/433 |
| 6,038,442 A * | 3/2000 | Ueda et al. ............... | 455/414.1 |
| 6,073,017 A | 6/2000 | Xu et al. .................... | 455/435 |
| 6,125,278 A | 9/2000 | Wieczorek et al. ......... | 455/437 |
| 6,223,042 B1 * | 4/2001 | Raffel ......................... | 455/455 |
| 6,363,254 B1 * | 3/2002 | Jones et al. ............... | 455/456.1 |
| 6,385,454 B1 * | 5/2002 | Bahl et al. .................. | 455/450 |

FOREIGN PATENT DOCUMENTS

| | | | |
|---|---|---|---|
| EP | 0590333 A2 | 9/1993 | .......... H04L/12/56 |
| KR | 1999-0031354 | 5/1999 | |
| WO | WO99/56476 | 11/1999 | ............ H04Q/7/20 |

OTHER PUBLICATIONS

Location Management Methods for Third–Generation Mobile Systems Sami Tabbane, ESPTT 1997 IEEE, Aug. 1997 pp. 72–78, 83 & 84.
Translation for Application No.: 10–2001–0069814.
Austrian Patent Office Service and Information Sector (TRF) Search report Singapore Application No.: 200106784–2.

* cited by examiner

*Primary Examiner*—Sonny Trinh
*Assistant Examiner*—Huy Phan
(74) *Attorney, Agent, or Firm*—Workman Nydegger (57) ABSTRACT

The mobile station visiting a location registration area at the present time plans to move to another location registration area at a future time. The mobile station sends the moving schedule information to the location management agent in a prescribed format to notify it of the scheduled destination. Receiving the moving schedule information, the location management agent learns the location registration area corresponding to the scheduled destination among the plurality of location registration areas. The location management agent sets a moving schedule flag in the location registration database in accordance with the moving schedule information with that format, which is received from the mobile station, and makes an additional registration of the moving time and the destination location registration area. Then, at the future time, it updates the location registration database, thereby making a new location registration.

6 Claims, 8 Drawing Sheets

EMBODIMENT 1

FIG.1

LOCATION REGISTRATION DATA BASE 20

| MOBILE STATION | LOCATION REGISTRATION AREA (22) | MOVING SCHEDULE FLAG (23) | MOVING TIME (24) | DESTINATION REGISTRATION AREA (25) |
|---|---|---|---|---|
| MS#1 | #1 | 1 | T | #N |
| . | . | . | . | . |
| . | . | . | . | . |
| . | . | . | . | . |
| . | . | . | . | . |

MOBILE COMMUNICATION SYSTEM, AND LOCATION REGISTRATION METHOD OF MOBILE STATION, RESOURCE CONTROL METHOD AND RECORDING MEDIUM IN MOBILE COMMUNICATION SYSTEM

This application claims priority under 35 U.S.C. 119 to patent application Ser. No. 2000-343886 filed Nov. 10, 2000 in Japan, the content of which is incorporated hereinto by reference.

BACKGROUND OF THE INVENTION

1. Field of the Invention

The present invention relates to a mobile communication system, and a location registration method of a mobile station, a resource control method and a recording medium in the mobile communication system, and more particularly to a mobile communication system that provides the mobile station with radio communication services from a base station via a radio channel, and a location registration method of a mobile station and a control method of the number of radio channel, and a recording medium that records programs of these methods in the mobile communication system.

2. Description of the Related Art

In a mobile communication system, a mobile station communicates with a base station via a radio channel. Thus, it is necessary for the system to make a decision as to which base station must transmit a signal to the mobile station when the base station carries out a downlink transmission to the mobile station. Thus, to identify the location of the mobile station, the conventional mobile communication system establishes a plurality of location registration areas, and manages the location registration areas in which mobile stations are present. This is called location registration. Here, the location registration area can be an area (cell) covered by a single base station, or an area consisting of a plurality of cells.

In the location registration method of the mobile station in the conventional mobile communication system, every time the mobile station moves across the location registration areas, the mobile station updates its registration under its own initiative (on the side of the mobile station). Therefore, even if the mobile station knows its own visiting location at a certain time in the future, it cannot make the location registration of the visiting location in advance. As a result, it is difficult to carry out flexible location registration control.

SUMMARY OF THE INVENTION

An object of the present invention is to implement flexible and effective location management of a mobile station by providing a location management agent acting for the mobile station to conduct the location registration, and to implement flexible and effective resource control by providing a resource management agent.

A mobile communication system in accordance with the present invention includes a location management agent for conducting a new location registration and a registration update of a mobile station in a prescribed service area, and comprises schedule notifying means for sending moving schedule information at a particular time from the mobile station to the location management agent in advance and a location registration database provided in the location management agent for registering the moving schedule information about the mobile station at the particular time such that the moving schedule information has correspondence with a scheduled destination location registration area. Wherein the location management agent, referring to the location registration database, updates the location registration area of the mobile station in the prescribed service area at the particular time.

A location registration method of a mobile station in a mobile communication system in accordance with the present invention includes a location management agent for conducting a new location registration and a registration update of the mobile station in a prescribed service area. The method comprises a first step of sending moving schedule information at a particular time from the mobile station to the location management agent in advance, a second step of registering, in a location registration database provided in the location management agent, the moving schedule information about the mobile station in correspondence with the particular time and a scheduled destination location registration area at the particular time and a third step of updating the location registration area of the mobile station in the prescribed service area at the particular time by the location management agent with referring to the location registration database.

A resource control method in a mobile communication system in accordance with the present invention conducts a new location registration and a registration update of a mobile station in a prescribed service area. The method comprises a first step of registering moving schedule information about the mobile station in a location registration database of a location management agent such that the moving schedule information has correspondence with moving schedule time, and an original position and a scheduled destination location registration area of the mobile station at the time, and a second step of adaptively controlling the number of the radio channels to be assigned to the location registration area by a resource management agent installed in each location registration area in the prescribed service area in response to a command sent from the location management agent, in accordance with the moving schedule information registered in the location registration database.

A recording medium in accordance with the present invention records a computer readable program of a location registration method of a mobile station in a mobile communication system including a location management agent for conducting a new location registration and a registration update of the mobile station in a prescribed service area. The recording medium causes a computer to execute the first step, the second step and the third step in the above described location registration method.

An alternate recording medium in accordance with the present invention records a computer readable program of a resource control method in a mobile communication system conducting a new location registration and a registration update of a mobile station in a prescribed service area. The program causes a computer to execute the first step and the second step in the above described resource control method.

The mobile communication system, the location registration method of a mobile station and the recording medium in the mobile communication system in accordance with the present invention can implement the flexible and effective location management of the mobile station using the location management agent acting for the mobile station to make the location management. In addition, using the resource control method and recording medium in the mobile communication system in accordance with the present invention makes it possible to predict the geographic distribution of future traffic by installing the resource management agent, thereby enabling more flexible and effective channel assignment.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The invention will now be described with reference to the accompanying drawings.

Embodiment 1

Figure 1:
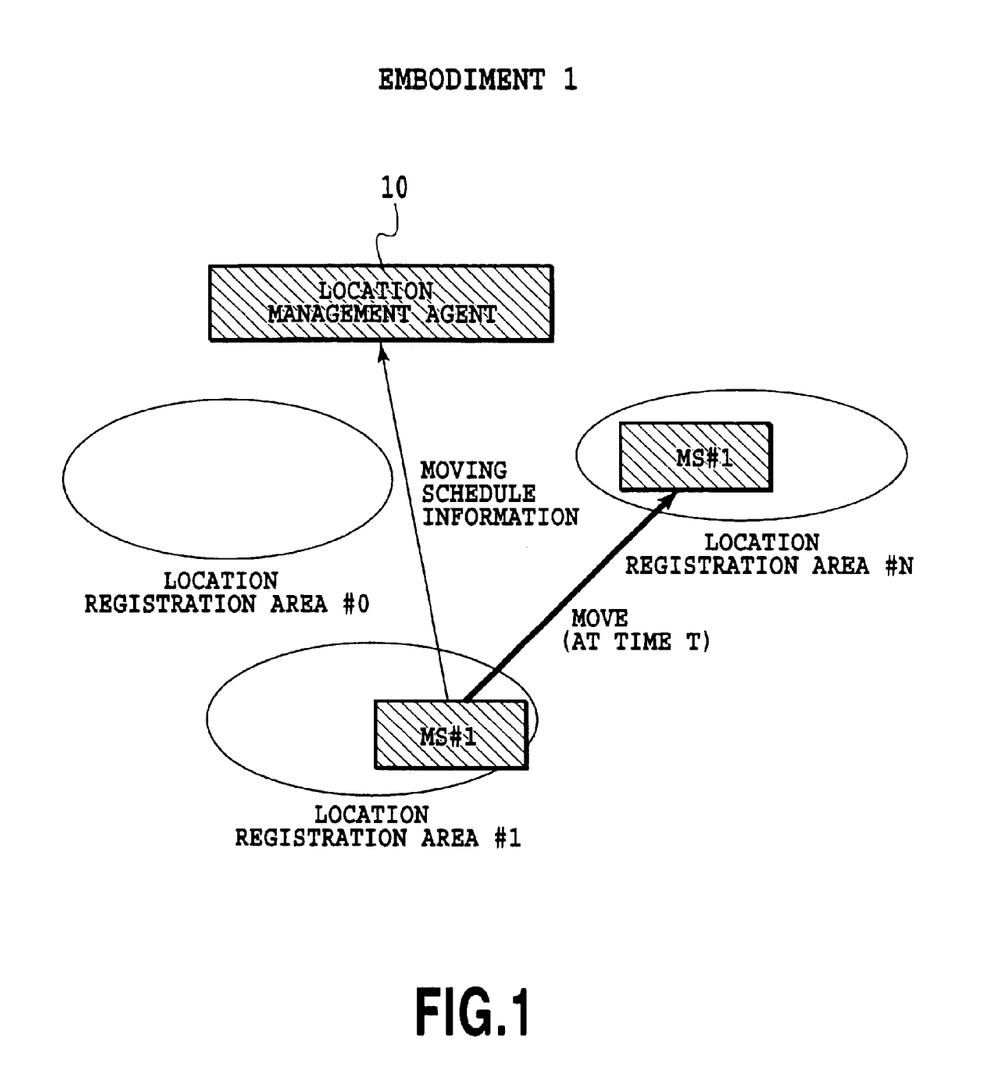
FIG. 1 is a diagram showing a system configuration of an embodiment 1 of the location registration of a mobile station in accordance with the present invention.

FIG. 1 is a diagram showing a system configuration of an embodiment 1 of the location registration of a mobile station in a mobile communication system using a radio channel in accordance with the present invention.

Figure 2:
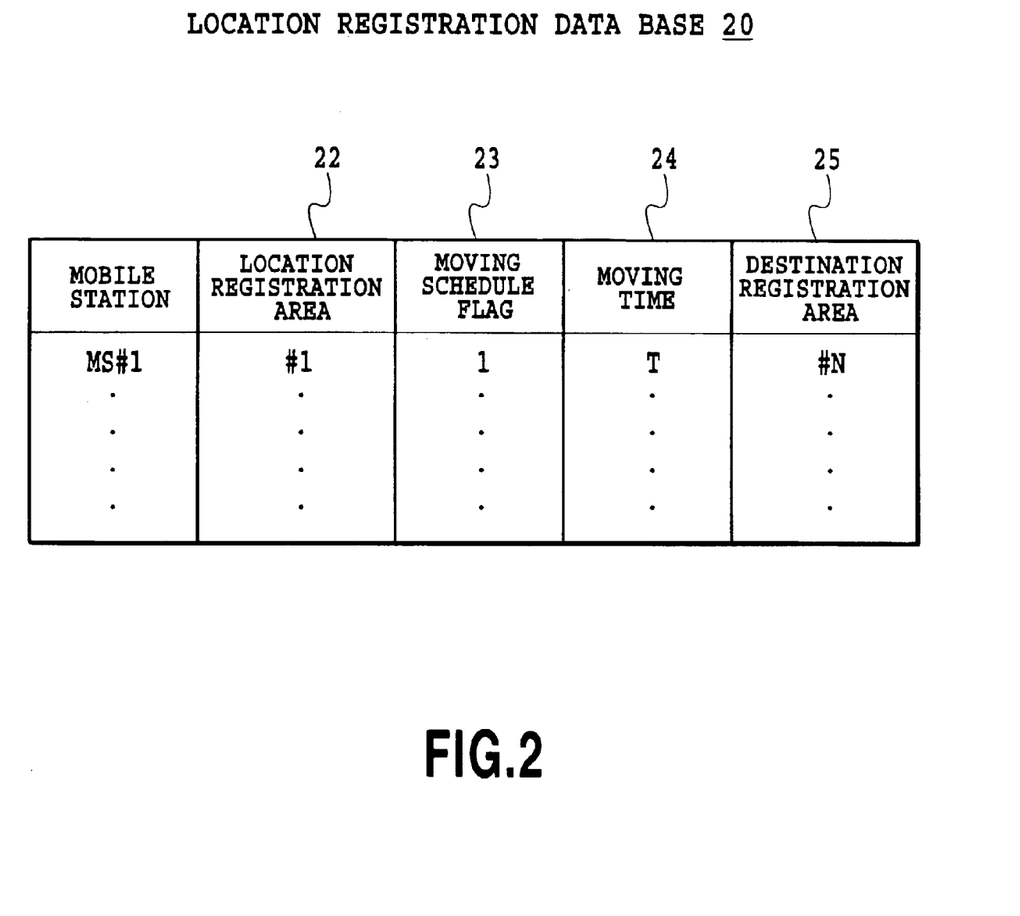
FIG. 2 is a table illustrating a location registration database in a location management agent.

In FIG. 1, reference numerals #0, #1, . . . , #N each designate a location registration area, the reference symbol MS#1 designates a mobile station, and the reference numeral 10 designates a location management agent. Each location registration area may comprise a plurality of base stations, or a single base station. For the simplicity of explanation, only one mobile station is shown in FIG. 1. The location management agent 10 comprises a location registration database 20 as shown in FIG. 2, and the downlink data routing in the network is carried out with looking up the location registration database 20.

Figure 3:
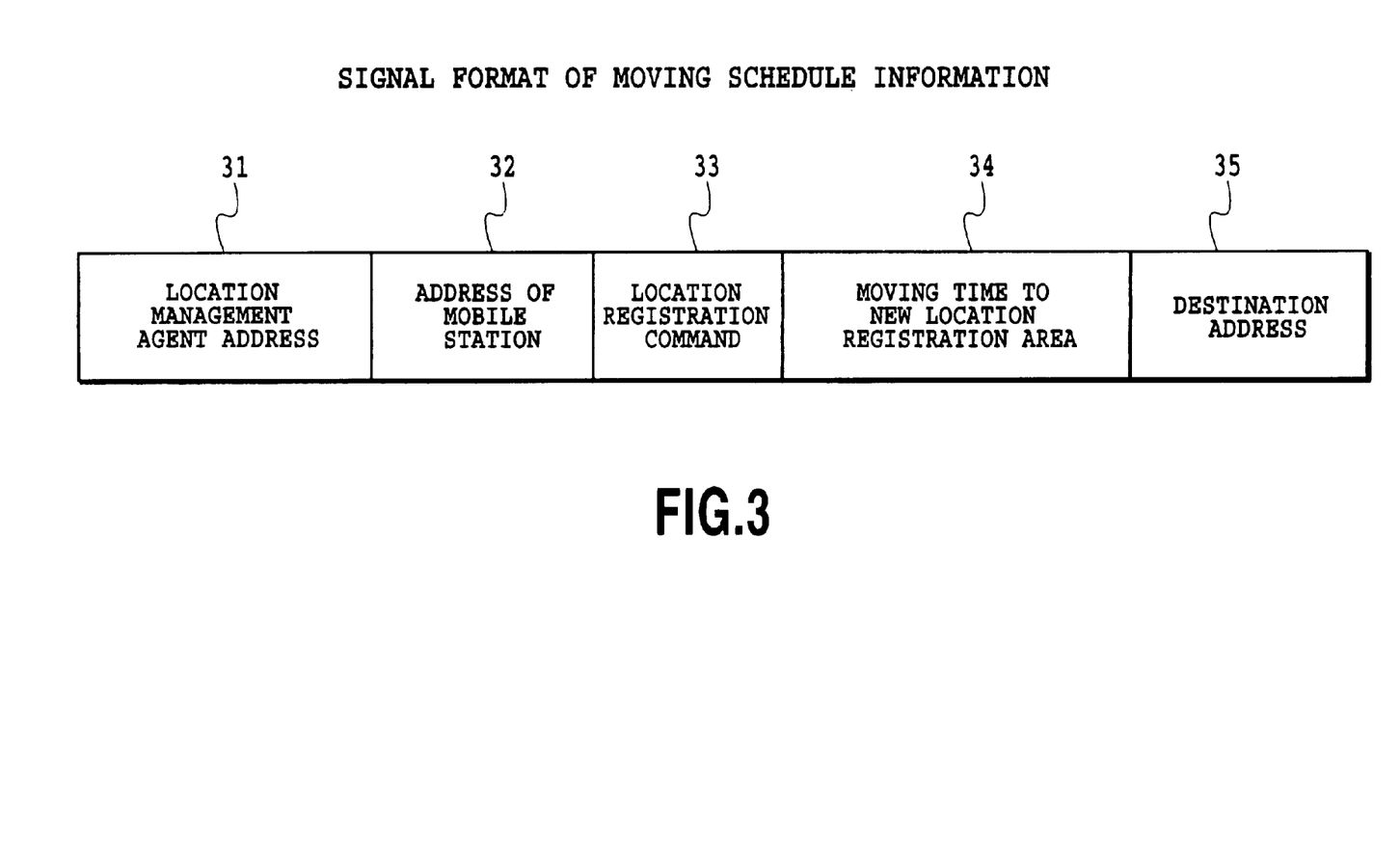
FIG. 3 is a schematic diagram illustrating a signal format of moving schedule information transmitted from a mobile station to a location management agent.

In the present embodiment, it is assumed that the mobile station MS#1 visiting the location registration area #1 at the present time is scheduled to move into the location registration area #N at a future time T. The mobile station MS#1 sends the moving schedule information to the location management agent 10 using the signal format as shown in FIG. 3, thereby notifying the location management agent 10 of the scheduled destination. The location management agent 10, which can be implemented in the form of software, has a function of making a decision from the received moving schedule information as to which one of the location registration areas #0, #1, . . . , #N corresponds to the scheduled destination.

As shown in FIG. 3, the moving schedule information of the present embodiment includes the location registration agent address 31, the mobile station address 32, a location registration command 33, and a moving time 34 to a new location registration area, and a destination address 35 at the time. In this format, the scheduled destination of the mobile station MS#1 can also be represented by using a telephone number or information about its latitude and longitude instead of the destination address 35.

According to the moving schedule information with the foregoing format, which is received from the mobile station MS#1, the location management agent 10 sets the moving schedule flag 23 in the location registration database 20 (FIG. 2), and makes an additional registration of a moving time 24 and a destination registration area 25. Then, it updates the location registration data base 20 at the time T. In other words, it rewrites the location registration area 22 from "#1" to "#N" at the time T, thereby making the new location registration.

Figure 4:
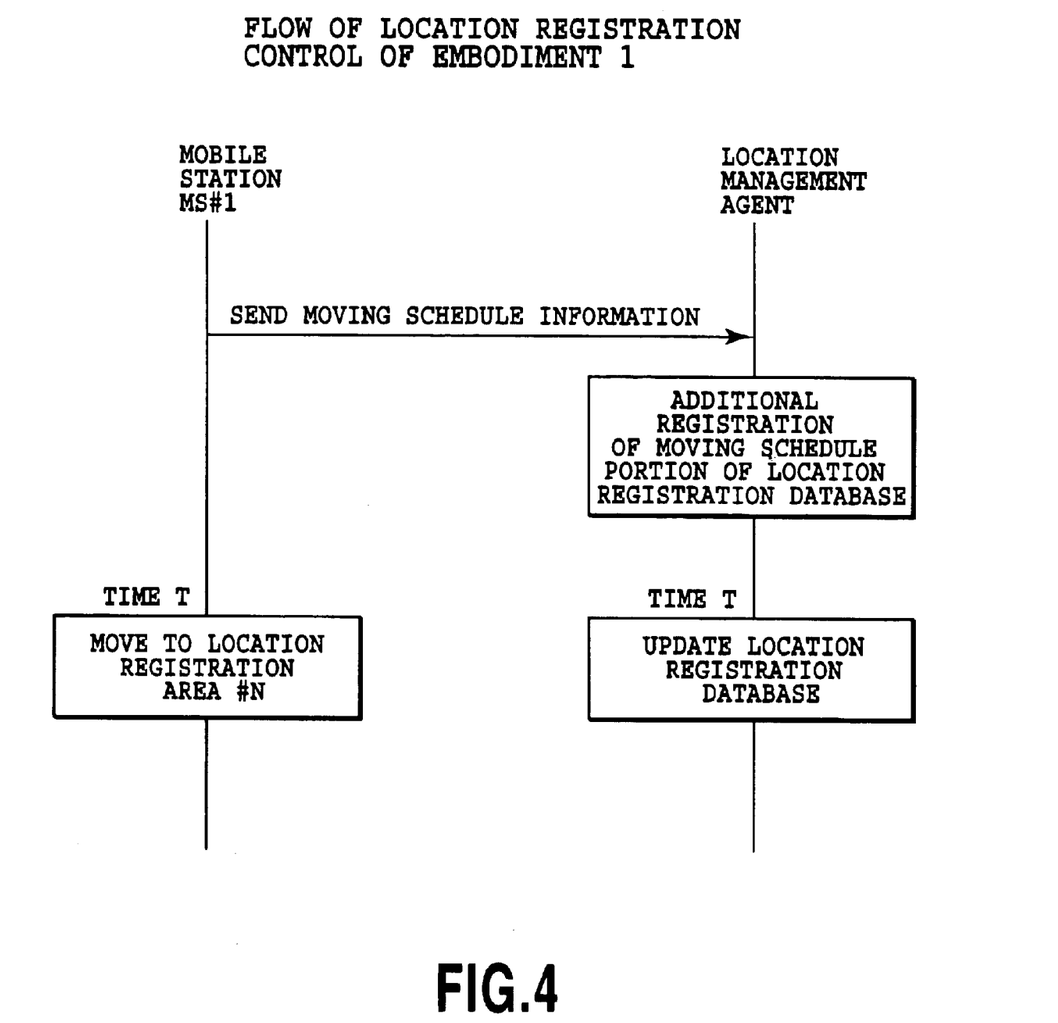
FIG. 4 is a flowchart illustrating a flow of the location registration control in the embodiment 1.

FIG. 4 shows a flow of the location registration control in the present embodiment when the mobile station MS#1 moves from the visiting area to the location registration area MS#N according to the scheduled. The control enables the location management agent 10, which carries out the location management in place of the mobile station, to conduct the registration in the location registration database before the movement of the mobile station, and to update the location registration database at the scheduled time. Thus, it can implement flexible and effective location management of the mobile station.

Although the location registration is made only at the time future T in the foregoing example, the present invention is not limited to it. For example, when the mobile station travels by a vehicle whose moving pattern is known in advance, and passes through a plurality of location registration areas until it arrives at the final destination, such control is possible that makes the location registration in the course of the movement. In this case, repeating the control as illustrated in FIG. 4 by (N+1) times, where N is the number of the location registration areas passed by, can implement the flexible and effective location management of the mobile station.

Incidentally, the mobile station can comprise schedule management software so that the schedule management software can automatically transmit the moving schedule information about the mobile station to the location management agent 10 to notify it of the scheduled destination.

Embodiment 2

Figure 5:
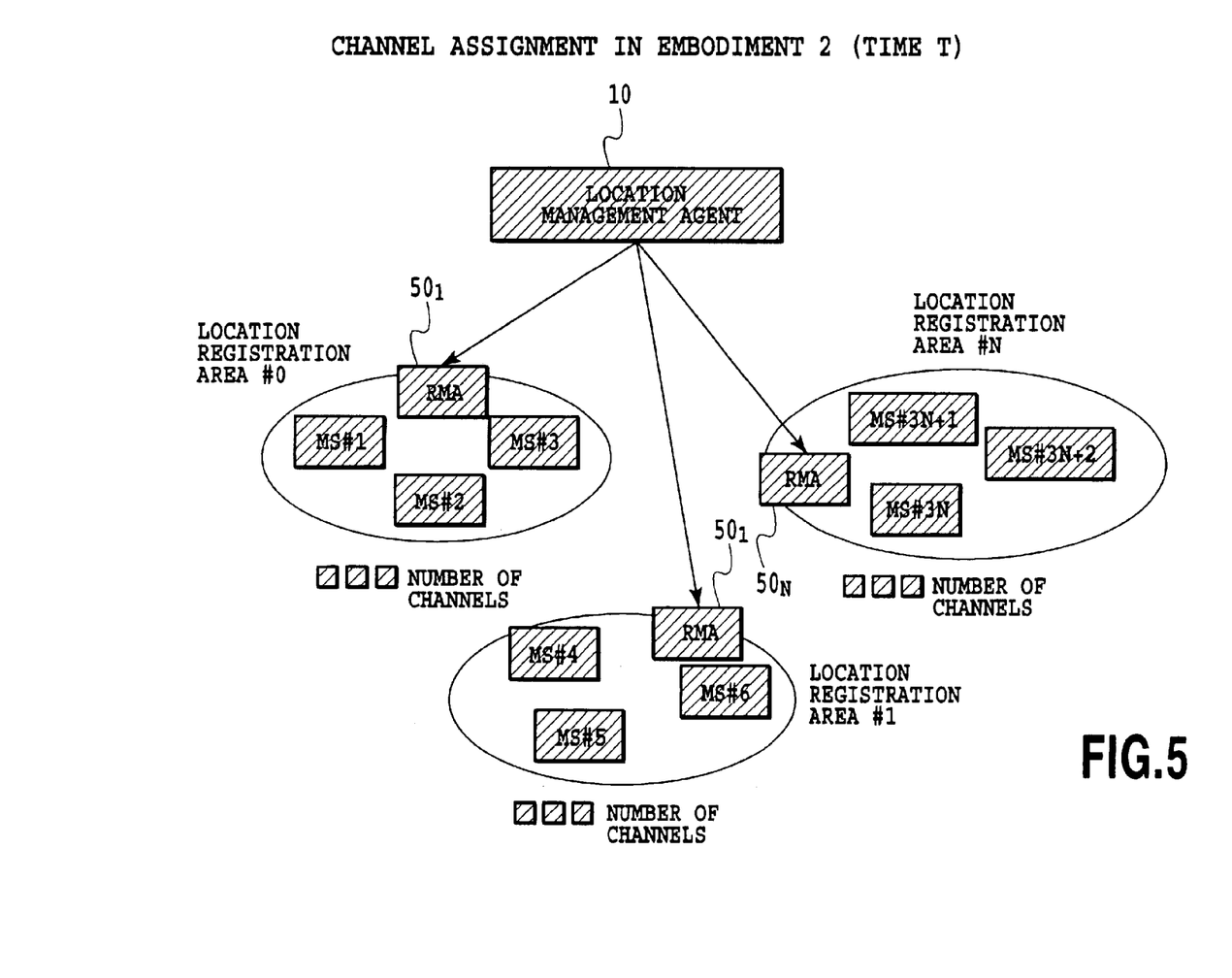
FIG. 5 is a diagram showing a system configuration of an embodiment of radio resource control using the moving schedule information the location registration agent in accordance with the present invention possesses.

FIG. 5 is a diagram showing a system configuration of an embodiment 2 of the radio resource control using the moving schedule information possessed by the location registration agent in the mobile communication system in accordance with the present invention. In the present embodiment, it is assumed that each location registration area controls the number of the radio channels, and has a resource management agent (RMA).

FIG. 5 shows the number of mobile stations and the number of radio channels (time slots, frequencies, codes etc.) in the location registration areas #0, #1, . . . , #N at the time T. In FIG. 5, the reference symbols MS#1, . . . , MS#6, MS3#N, MS3#N+1 and MS3#N+2 each designate a mobile station; and $RMA5_0$, $RMA50_1$, . . . , $RMA\ 50_N$ each designate a resource management agent. In the present embodiment, it is assumed that one channel per mobile station is assigned to each location registration area for the simplicity of explanation.

Figure 6:
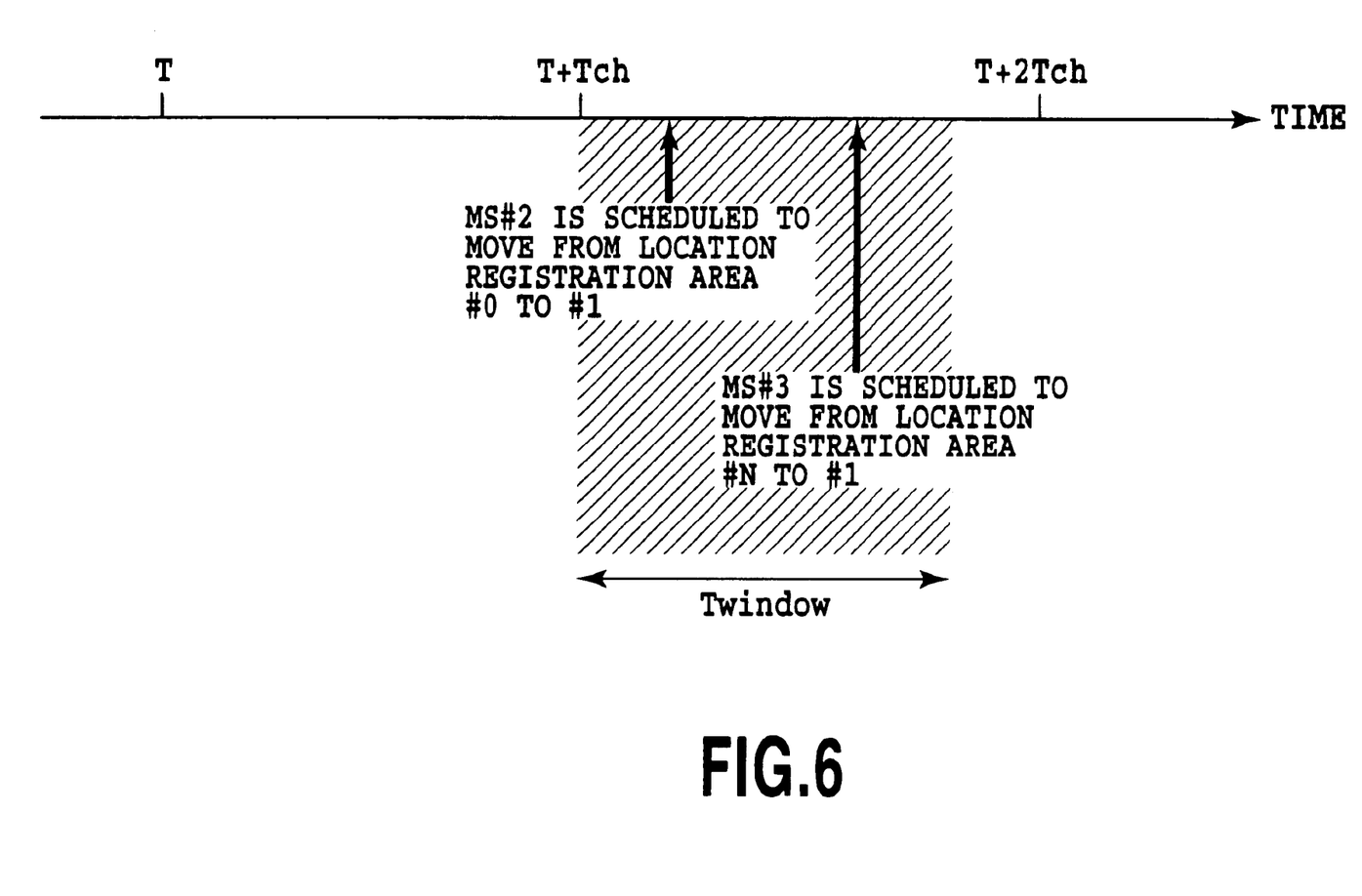
FIG. 6 is a schematic diagram illustrating the moving schedule information of individual mobile stations the location management agent has in the location registration database.

FIG. 6 is a schematic diagram illustrating the moving schedule information about the individual mobile stations the location management agent 10 has in the location registration database.

The moving schedule information as illustrated in FIG. 6 indicates that the mobile station MS#2 is scheduled to move from the location registration area #0 to #1, and the mobile station MS#3N is scheduled to move from the location registration area #3N to #1 within a predetermined time period Twindow after a radio channel assignment update period Tch has elapsed from the time T, where Twindow is greater than zero and equal to or less than Tch.

Figure 7:
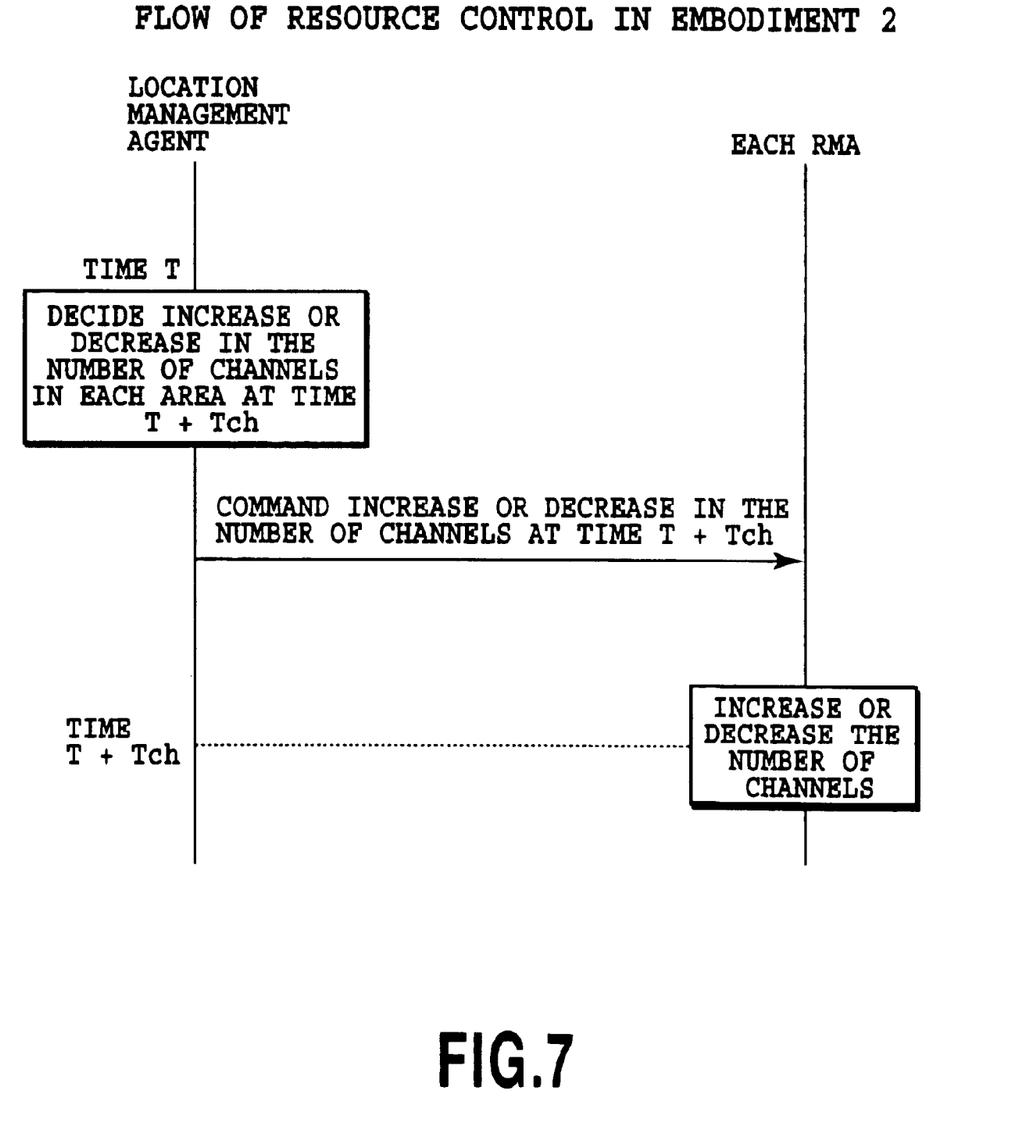
FIG. 7 is a flowchart illustrating a flow of radio resource control in an embodiment 2.
Figure 8:
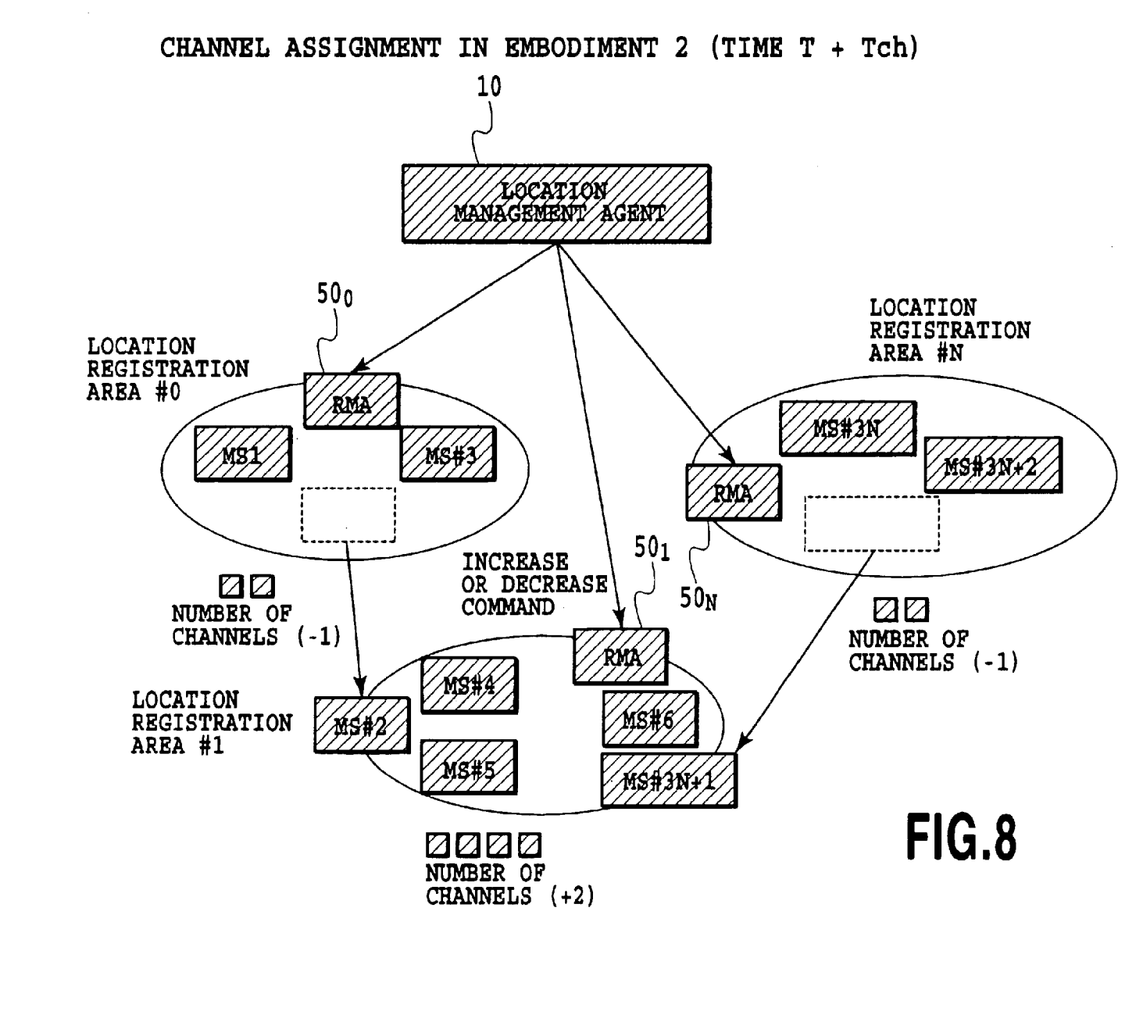
FIG. 8 is a diagram showing a system configuration of the radio resource control in the embodiment 2.

According to the moving schedule information, the location management agent 10 carries out the location registration control as illustrating in FIG. 7, which establishes the number of the mobile stations and the lo number of channels as shown in FIG. 8 at the time T+Tch.

Here, it is assumed that the radio channels assigned to the location registration areas #0, #1, ..., #N are determined by the number of the mobile stations that are scheduled to be present in the location registration areas #0, #1, ..., #N from the time T+Tch to the time T+Tch+Twindow, in accordance with the moving schedule information.

In the present embodiment, the individual location registration areas #0, #1, ..., #N are each assigned three channels at a particular time T (FIG. 5). In FIG. 7, according to the moving schedule of the individual mobile stations during the time period Twindow from the time T+Tch as illustrated in FIG. 6, the location management agent 10 makes a decision as to an increase or decrease in the number of channels in the location registration areas #0, #1, ..., #N at the time (T+Tch), calculates the number of the radio channels in the individual location registration areas #0, #1, ..., #N, and sends a command of the increase or decrease to the corresponding resource management agent (RMA). The individual resource management agents increase or decrease the number of channels in accordance with the command.

As a result, the number of channels of the location registration area #0 at the time (T+Tch) is reduced by one from three to two, the number of channels of the location registration area #N is also reduced by one from three to two, and the number of channels of the location registration area #1 at the time (T+Tch) is increased by two from three to five.

As described above, the present embodiment can implement the channel assignment of the individual location registration areas flexibly and effectively before the movement of the mobile stations by using the moving schedule information possessed by the location registration agent.

Developed Embodiment

It is obvious that the object of the present invention can be accomplished by providing a system or apparatus with a recording medium (storing medium) that records a program code of software for implementing the functions of the foregoing embodiments, and by reading and executing the program code stored in the recording medium by a computer (or CPU or MPU) of the system or apparatus. In this case, the program code itself read from the recording medium can implement the functions of the foregoing embodiments, and hence the recording medium recording the program code constitutes the present invention. As for the recording medium for recording the program code and variable data such as tables, such media as a floppy disk, hard disk, optical disk, magneto-optical disk, and nonvolatile memory card are available.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A mobile communication system including a location management agent for conducting a new location registration and a registration update of a mobile station in a prescribed service area, the system comprising:

schedule notifying means for sending a moving schedule information of said mobile station at a particular time in advance from said mobile station to said location management agent; and a location registration database provided in said location management agent for registering said moving schedule information about said mobile station in said prescribed service area which information includes said particular time and a scheduled destination location registration area at said particular time, wherein said location management agent is arranged to update a location registration area of said mobile station in said prescribed service area at said particular time with reference to said location registration database, wherein said location registration database is arranged to register said moving schedule information about said mobile station, and each location registration area in said prescribed service area includes a resource management agent for managing a number of its radio channels, and said resource management is arranged to adaptively control the number of radio channels to be assigned to said location registration area in said prescribed service area in response to a command sent from said location management agent in accordance with said moving schedule information registered in said location registration database.

2. The mobile communication system as claimed in claim 1, wherein said schedule notifying means includes schedule managing means installed in said mobile station, and said schedule managing means notifies said location management agent of the moving schedule information automatically.

3. A location registration method of a mobile station in a mobile communication system including a location management agent for conducting a new location registration and a registration update of the mobile station in a prescribed service area, said location registration method of a mobile station in a mobile communication system comprising:

a first step of sending a moving schedule information of said mobile station at a particular time in advance from said mobile station to said location management agent;

a second step of registering, in a location registration database provided in said location management agent, said moving schedule information about said mobile station in said prescribed service area which information includes said particular time and a scheduled destination location registration area at said particular time;

a third step of updating a location registration area of said mobile station in said prescribed service area at said particular time by said location management agent with reference to said location registration database, wherein said location registration database is arranged to register said moving schedule information about said mobile station, and each location registration area in said prescribed service area includes a resource management agent for managing a number of its radio channels, and said resource management is arranged to adaptively control the number of radio channels to be assigned to said location registration area in said prescribed service area in response to a command sent from said location management agent in accordance with said moving schedule information registered in said location registration database.

4. The location registration method of a mobile station in a mobile communication system as claimed in claim 3, wherein the first step notifies said location management agent of the moving schedule information automatically by schedule managing means installed in said mobile station.

5. A recording medium recording a computer readable program of a location registration method of a mobile station in a mobile communication system including a location management agent for conducting a new location registration and a registration update of the mobile station in a prescribed service area, said program causes a computer to execute:

a first step of sending a moving schedule information of said mobile station at a particular time in advance from said mobile station to said location management agent;

a second step of registering, in a location registration database provided in said location management agent, said moving schedule information about said mobile station in said prescribed service area which information includes said particular time and a scheduled destination location registration area at said particular time; and a third step of updating a location registration area of said mobile station in said prescribed service area at said particular time by said location management agent with reference to said location registration database, wherein said location registration database is arranged to register said moving schedule information about said mobile station, and each location registration area in said prescribed service area includes a resource management agent for managing a number of its radio channels, and said resource management is arranged to adaptively control the number of radio channels to be assigned to said location registration area in said prescribed service area in response to a command sent from said location management agent in accordance with said moving schedule information registered in said location registration database.

6. The recording medium as claimed in claim 5, wherein the first step of said program notifies said location management agent of the moving schedule information automatically by schedule managing means installed in said mobile station.

* * * * *

UNITED STATES PATENT AND TRADEMARK OFFICE
CERTIFICATE OF CORRECTION

PATENT NO. : 6,885,865 B2
DATED : April 26, 2005
INVENTOR(S) : Takehiro Ikeda et al.

It is certified that error appears in the above-identified patent and that said Letters Patent is hereby corrected as shown below:

Title page,
Item [56], References Cited, OTHER PUBLICATIONS, "Location Management" reference, change "Mobile Systems" to -- Mobile Systems, --.

Column 3,
Line 53, change "with" to -- by --.

Column 4,
Line 15, change "data base" to -- database --.
Line 61, change "RMA5$_O$" to -- RAM50$_0$ --.

Column 5,
Line 13, change "illustrating" to -- illustrated --.
Line 14, remove "lo".

Signed and Sealed this

Thirteenth Day of September, 2005

JON W. DUDAS
*Director of the United States Patent and Trademark Office*